June 5, 1956
H. R. DOVER
2,749,431
TILTABLE TAIL LIGHT
Filed Dec. 15, 1952
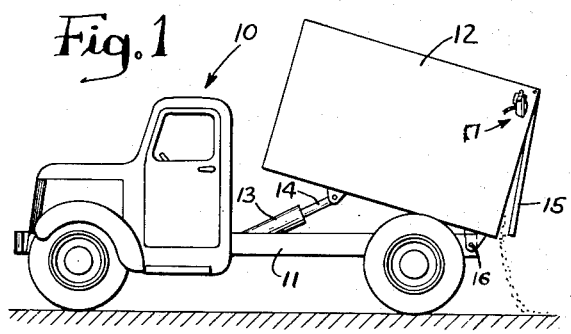
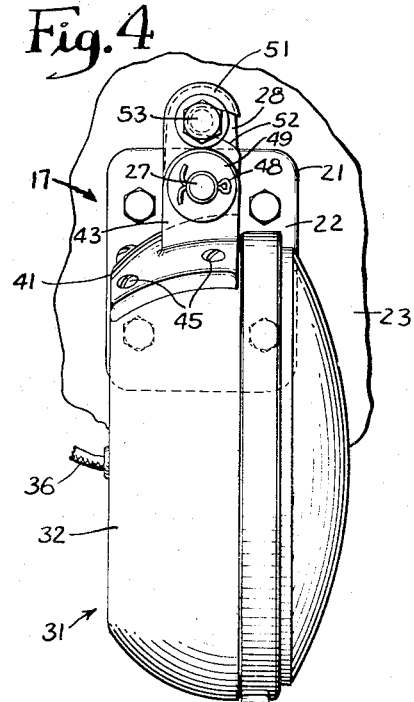
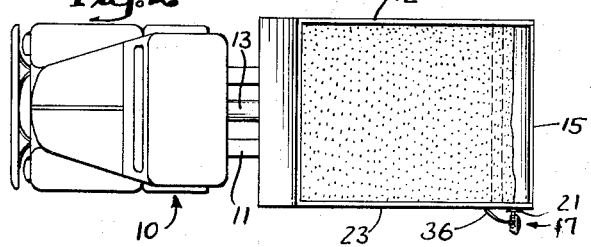
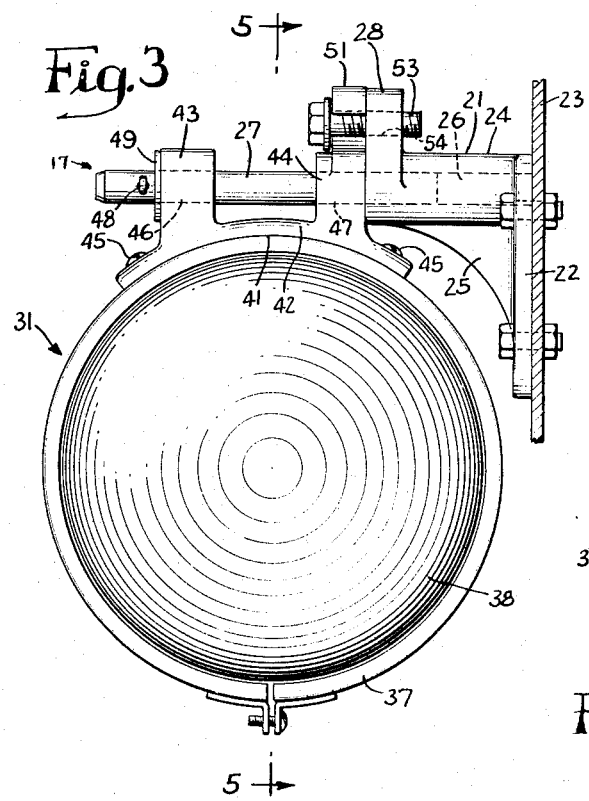
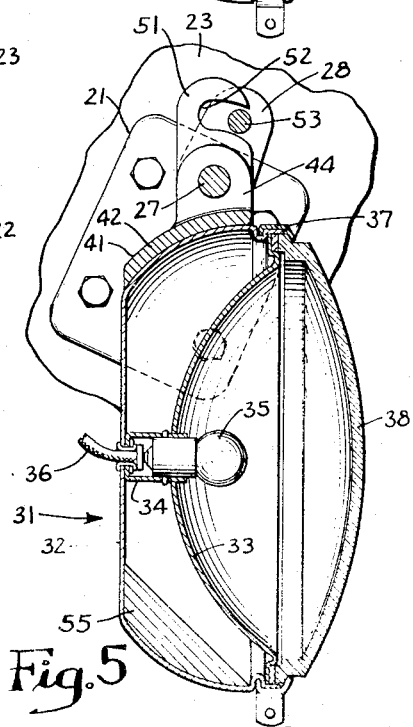
Inventor
HERBERT R. DOVER
By Morris Spector
Atty.

2,749,431

TILTABLE TAIL LIGHT

Herbert R. Dover, Chicago, Ill.

Application December 15, 1952, Serial No. 326,045

8 Claims. (Cl. 240—8.3)

This invention relates to signal lights, such as tail lights, particularly adapted for use on automobile trucks.

It is elemental that automobile trucks must be provided with rear signal lights, such as tail lights and clearance lights. When such lights are mounted on dump trucks they serve their normal purpose so long as the dump truck body is in its normal lowered position. However, when the body is tilted or raised to its dumping position the rear tail light that is mounted on the body is tilted and often also lowered so that it ceases to be effective. It often happens that dump trucks are required to travel on a highway with the body of the truck in a partial or completely raised position. Under such conditions the tail light of the truck is generally not visible. When dump trucks are required to travel with their bodies in their raised positions it is also necessary that the travel be very slow. Because of the slowness of travel the need for a tail lamp is increased, rather than decreased. This condition may prevail, for instance, when a dump truck containing sand is traveling on an ice covered highway for the purpose of distributing sand on the highway as a safety measure for traffic that is to follow. Dump trucks are frequently used for this purpose, the operator progressively raising the body of the dump truck as the contents thereof continue to flow from the opened gate of the truck. It is one of the objects of the present invention to provide a lamp which may be used as a tail lamp and which, when mounted on a tilting truck body, will always maintain its required angle to the vertical and to the horizontal regardless of the angle of tilt of the body. By this arrangement the lens of the light always faces directly rearwardly at the proper angle to the vertical for tail light purposes regardless of the amount of tilt of the truck body. In the preferred embodiment of the present invention this result is obtained by mounting the lamp for swinging movement about a horizontal axis and providing a sufficient weight in the lamp casing so that the lamp will always hang vertically in its support regardless of the turning of the lamp support as the truck body tilts.

It is a further object of the present invention to provide a lamp support of the above mentioned character upon which a lamp may be mounted for swinging about a horizontal axis so that it will always hang vertically regardless of the tilt of the support, and on which the lamp may be locked against swinging movement if desired in order to prevent swinging of the lamp when the truck travels at its normal rate of speed and with the truck body in the lowered position.

It is a further object of the present invention to provide a dump truck with a pendulously mounted stop lamp.

The attainment of the above and further objects of the present invention will be apparent from the following specification taken in conjunction with the accompanying drawing forming a part thereof.

In the drawing:

Figure 1 is a side elevation of a dump truck having a tail light in accordance with this invention;

Figure 2 is a top plan view of the truck and tail light shown in Figure 1;

Figure 3 is a rear elevation of the tail light shown in Figure 1, with a portion of the truck shown in section;

Figure 4 is a fragmentary side elevation of the truck and light shown in Figure 1 with the light in a non-tilted position relative to the truck; and Figure 5 is a vertical section taken along the line 5—5 of Figure 3.

More specifically, there is shown in the drawings a dump truck 10 including a chassis 11 on which a body 12 is mounted for pivotal movement between a normal, or non-tilted, position and a dumping, or tilted, position. A hydraulic cylinder 13 and piston 14 control the position of the body relative to the chassis 11, and a tail gate 15 adjustable relative to the body controls the rate of dumping the contents of the body. The body pivots about an axis 16 transverse of the body.

A tail light 17 is mounted on the body 12. The tail light includes a mounting bracket 21 having a mounting plate 22 that is bolted to a side wall 23 of the truck body, a bearing sleeve 24 cast integrally with the plate 22, and a reinforcing web 25. The sleeve has an axial bore 26 formed therein into which a round mounting pivot rod 27 is driven, and also has a lug 28 integral therewith and projecting therefrom. The lug 28 has a tapped bore 54 therein. The pivot rod extends in a horizontal direction from the truck body 12.

A tail or stop lamp 31 is provided on the rod 27. The lamp 31 includes a housing 32 supporting a reflector 33 and a light socket 34, of a well known type, for receiving an incandescent light bulb 35, and suitably connected to a control switch (not shown) by an insulated conductor 36. A split rim 37 clamps a lens 38 and the reflector 33 to the housing 32 by holding a peripheral rim of the reflector against an internal circumferential bead on the housing 32. A swinging bracket arm 41 having a concave plate 42 complementary to a portion of the periphery of the housing 32 and arms 43 and 44 is secured to the housing 32 by screws 45. The arms 43 and 44 have aligned bores 46 and 47 mounting the bracket for free sliding and pivotal movement on the rod 27. A cotter pin 48 and a washer 49 secure the bracket 41 against sliding movement on the rod 27. A locking lug 51 projects from and is integral with the arm 44. The lug 51 has an arcuate slot 52 therein centered on the bore 47 so that it will not interfere with pivoting of the bracket 41 on the rod 27 upon loosening of a cap screw 53 that projects through the slot 52 and threads into a tapped bore 54 in the lug 28. Upon tightening of the screw 53 the locking lug 51 is held against the lug 28 and prevents swinging of the lamp 31. A weight 55 of lead or the like is secured in lower portion of the housing 32 to increase the pendulum effect of the tail light when the cap screw 53 is loosened. The arms 43 and 44 of the bracket 41 are positioned with respect to the center of gravity of the tail light so that the tail light hangs in a vertical position from the rod 27 with the light beam thereof properly centered with respect to the horizontal whenever the cap screw 53 is loosened.

When the truck is operated with the body 12 in a non-tilted position relative to the chassis 11, the cap screw 53 is in a tightened position locking the tail light in a position perpendicular to the chassis. When the truck is to be used to dump material from the body 12 with the body tilted, the screw 53 is loosened so that the bracket 41 is free to pivot on the rod 27 and the weighted tail light holds to a vertical position so that it is always visible to vehicles approaching the truck from the rear, this being true regardless of the extent of tilting of the body 12.

In compliance with the requirements of the patent statutes I have here shown and described a preferred embodiment of my invention. It is, however, to be understood that the invention is not limited to the precise construction here shown, the same being merely illustrative of the principles of the invention.

What I consider new and desire to secure by Letters Patent is:

1. A mounting unit for supporting a tail light on a truck body comprising a bracket to be secured to a side of the truck body and provided with a socket, a rod having one end secured in the socket, a plate pivotally supported on said rod and secured to a tail light, an arm secured to the plate and having a hole through which the rod fits, means retaining the arm pivotally on the rod, said arm and said bracket having adjacent lugs, one of said lugs having an arcuate slot therein centered on the rod and the other lug having a tapped bore therein facing the slot, and locking means threaded into the tapped bore to selectively lock the arm against pivotal movement relative to the bracket and to unlock the arm and permit such movement.

2. A light for the side of a dump truck body comprising a fixed bracket having a plate adapted to be secured to the side of the dump truck body and a sleeve projecting from the plate, said sleeve having a lug at the outer end thereof provided with a tapped bore, a rod having an end portion secured in the outer end of the sleeve, an electric tail light having a housing, a suspending bracket having a plate fitting on and secured rigidly to a portion of the housing and also provided with a pair of arms having aligned bores therethrough pivotally supported on said rod, means securing the suspending bracket against movement along the rod, the arm adjacent to the sleeve having a lug projecting therefrom provided with an arcuate slot centered on the rod, and screw means projecting through the arcuate slot and threaded into the tapped bore in the first mentioned lug.

3. The combination defined by claim 2 characterized by the fact that the tail light housing is weighted in the portion thereof opposite to the suspending bracket.

4. A tail light assembly for a dump truck body comprising a plate to be secured to a side of the dump truck body, a boss projecting from one side of the plate having a locking lug projecting laterally from the outer end thereof, a rod projecting axially from the boss and supported thereby, a suspending bracket mounted pivotally on the rod and secured to an edge of an electric tail light housing, said bracket having a locking lug thereon, and selectively operable means for locking said locking lugs against movement relative to one another.

5. The combination defined by claim 4 characterized by the fact that said suspending bracket includes a plate and a pair of arms having aligned bores fitting over said rod and projecting from the plane.

6. A tail light assembly comprising a housing having a closed front and an open back, an electric lamp unit mounted in the open end of said housing and enclosing the open end thereof, a bracket for securing said assembly to a vehicle body including a sleeve having a lug at its outer and provided with a tapped bore, a rod having an end portion projecting into and secured in said sleeve, a plate secured to the top of said housing and having an arm with a bore receiving said rod for pivotally supporting the housing, a lug carried by said plate and located opposite to said first-mentioned lug, said last-mentioned lug provided with an arcuate slot which is centered and offset with respect to the said rod, said tapped bore of said first-mentioned lug facing said slot, screw means having a shank projecting through the arcuate slot and threaded into said tapped bore of said lug, said screw means having a head on the outside of said slotted lug for forcing said two-mentioned lugs together when the screw means is tightened, to selectively lock said plate against pivotal movement relative to said bracket, and to unlock the plate to permit such movement when the screw means is loosened slightly, and to thereby also minimize the outward axial movement of the plate on said rod, said housing being weighted at its lower end to orientate the lamp by pendulum action so that the light emitted by said lamp may always be directed in a horizontal direction when it is free to swing.

7. A tail light assembly comprising a housing having a closed front and an open back, an electric lamp unit mounted in the open end of said housing and enclosing the open end thereof, a bracket for securing said assembly to a vehicle body including a sleeve having a lug at its outer end, a rod having an end portion projecting into and secured in said sleeve, a plate secured to the top of said housing and having an arm with a bore receiving said rod for pivotally supporting the housing, a lug carried by said plate, means for selectively preventing relative movement between said two-mentioned lugs to lock selectively the plate against pivotal movement relative to the bracket and to unlock the plate to permit such movement, said housing being weighted at its lower end to orientate the lamp by pendulum action so that the light emitted by said lamp may always be directed in a horizontal direction when it is free to swing.

8. A tail light comprising a housing open at the front and closed at the back, a lamp reflector substantially closing the open end and concave into the body of the housing, means for supporting an electric light bulb substantially along the axis of the reflector, a mounting bracket secured to the housing, a pivot support rod extending through the bracket and constituting means for pendulously supporting the housing, means weighting the housing on the side thereof opposite the bracket for transferring the center of gravity thereof to a location spaced from the central axis thereof in a direction away from the bracket, a second mounting bracket supporting the pivot rod, said second bracket including means for mounting it rigidly on a support, and locking means for releasably locking the first bracket against swinging movement with respect to the second bracket, said locking means being offset with respect to the longitudinal axis of the pivot support rod.

References Cited in the file of this patent

UNITED STATES PATENTS

| 444,815 | Casler | Jan. 20, 1891 |
| 974,034 | Davis | Oct. 25, 1910 |
| 1,294,968 | Taylor | Feb. 18, 1919 |
| 1,595,987 | Bennett | Aug. 17, 1926 |
| 2,667,569 | Lethcoe | Jan. 26, 1954 |

FOREIGN PATENTS

| 742,682 | France | Jan. 4, 1933 |